(12) United States Patent
Blackford et al.

(10) Patent No.: US 11,993,871 B2
(45) Date of Patent: May 28, 2024

(54) LIMITED CONDUCTION HEAT RETAINING MATERIALS

(71) Applicants: Michael "Woody" Blackford, Portland, OR (US); Jeffrey Thomas Mergy, Portland, OR (US); Rebecca A. Durr, Portland, OR (US); Haskell W. Beckham, Portland, OR (US)

(72) Inventors: Michael "Woody" Blackford, Portland, OR (US); Jeffrey Thomas Mergy, Portland, OR (US); Rebecca A. Durr, Portland, OR (US); Haskell W. Beckham, Portland, OR (US)

(73) Assignee: COLUMBIA SPORTSWEAR NORTH AMERICA, INC., Beaverton, OR (US)

( * ) Notice: Subject to any disclaimer, the term of this patent is extended or adjusted under 35 U.S.C. 154(b) by 104 days.

(21) Appl. No.: 17/503,194

(22) Filed: Oct. 15, 2021

(65) Prior Publication Data
US 2022/0034003 A1    Feb. 3, 2022

Related U.S. Application Data

(63) Continuation-in-part of application No. 16/162,035, filed on Oct. 16, 2018, now Pat. No. 11,612,201.
(Continued)

(51) Int. Cl.
*D03D 1/00*  (2006.01)
*B32B 3/08*  (2006.01)
(Continued)

(52) U.S. Cl.
CPC .......... *D03D 1/0035* (2013.01); *B32B 3/085* (2013.01); *B32B 3/16* (2013.01); *B32B 3/28* (2013.01);
(Continued)

(58) Field of Classification Search
CPC .... B32B 3/16; B32B 3/18; B32B 3/20; B32B 3/22; Y10T 442/00; Y10T 428/00
See application file for complete search history.

(56) References Cited

U.S. PATENT DOCUMENTS

| 4,032,681 | A |   | 6/1977 | Jonnes |
| 4,045,931 | A | * | 9/1977 | Becker ...................... E04B 1/78 52/406.1 |

(Continued)

FOREIGN PATENT DOCUMENTS

| DE |    69433652 T2 | * | 2/2004 | ............. A62B 17/00 |
| DE | 202009000852 U1 | * | 5/2009 | ........... A01K 13/007 |

(Continued)

OTHER PUBLICATIONS

Polymer Technologies Inc.; Engineering Sound Solutions; "Open vs. Closed Cell Foam: Understanding Permeability" https://blog.polytechinc.com/author/admin/ (Year: 2018).*
(Continued)

*Primary Examiner* — Jennifer A Steele
(74) *Attorney, Agent, or Firm* — Schwabe, Williamson & Wyatt, P.C.

(57) ABSTRACT

Embodiments relate to an article of clothing that includes a base material with a moisture vapor transfer rate (MVTR) of at least 2000 g/m²/24 h (JIS 1099 A1). The article of clothing may further include a foam-based spacer material coupled to the first side of the base material. The foam-based spacer material may be positioned between the base material and a wearer of the article of clothing when the article of clothing is worn. The foam-based spacer material may be an array of discrete elements coupled with the base material. Other embodiments may be described and/or claimed.

19 Claims, 17 Drawing Sheets

Related U.S. Application Data

(60) Provisional application No. 62/573,154, filed on Oct. 16, 2017.

(51) Int. Cl.
  *B32B 3/16* (2006.01)
  *B32B 3/28* (2006.01)
  *C08L 101/00* (2006.01)
  *D03D 15/513* (2021.01)

(52) U.S. Cl.
  CPC .......... *C08L 101/00* (2013.01); *D03D 15/513* (2021.01); *B32B 2307/304* (2013.01); *B32B 2307/724* (2013.01); *B32B 2437/00* (2013.01); *C08L 2201/08* (2013.01); *C08L 2203/14* (2013.01); *D10B 2321/02* (2013.01); *D10B 2331/06* (2013.01); *D10B 2331/10* (2013.01); *D10B 2501/04* (2013.01)

(56) References Cited

U.S. PATENT DOCUMENTS

| | | | | |
|---|---|---|---|---|
| 4,136,222 | A | * | 1/1979 | Jonnes .................. B32B 3/12 428/116 |
| 4,622,253 | A | | 11/1986 | Levy |
| 4,734,306 | A | * | 3/1988 | Lassiter ............... A41D 31/065 428/102 |
| 8,424,119 | B2 | | 4/2013 | Blackford |
| 8,918,919 | B2 | | 12/2014 | Scholz |
| 8,993,089 | B2 | * | 3/2015 | Conolly .................. B32B 5/024 442/222 |
| 2003/0148692 | A1 | * | 8/2003 | Chikamori ............. B32B 27/12 428/318.6 |
| 2008/0113143 | A1 | * | 5/2008 | Taylor ...................... B32B 5/32 428/47 |
| 2010/0247855 | A1 | * | 9/2010 | Bletsos .................. C23C 14/20 428/209 |
| 2011/0203783 | A1 | * | 8/2011 | Blackford .............. D06M 11/83 165/185 |
| 2012/0141750 | A1 | * | 6/2012 | Taylor ..................... F16F 1/376 428/201 |
| 2015/0104604 | A1 | | 4/2015 | Rock et al. |
| 2015/0133836 | A1 | * | 5/2015 | Pollock .................. A61H 1/008 601/136 |
| 2015/0223533 | A1 | | 8/2015 | Blakely et al. |
| 2017/0273377 | A1 | * | 9/2017 | Aihara ..................... A41B 1/08 |

FOREIGN PATENT DOCUMENTS

| | | | | |
|---|---|---|---|---|
| GB | 2444915 A | * | 6/2008 | .......... A41D 31/005 |
| JP | 63-46496 A | | 3/1988 | |
| KR | 20130110918 A | * | 10/2013 | .............. B32B 5/18 |
| WO | 2014/120867 | | 8/2014 | |

OTHER PUBLICATIONS

Machine Translation of DE69433652 (Year: 2004).*
Notice for Reasons of Rejection filed in JP Patent Application No. 2020-519399, dated Nov. 25, 2022; 6 pages (including English translation).

* cited by examiner

LIMITED CONDUCTION HEAT RETAINING MATERIALS

CROSS REFERENCE TO RELATED APPLICATION

This application is a continuation in part of U.S. patent application Ser. No. 16/162,035, filed Oct. 16, 2018, which claims the priority benefit of the earlier filing date of U.S. Provisional Application No. 62/573,154, filed Oct. 16, 2017, the contents of which are hereby incorporated herein by reference in their entirety.

TECHNICAL FIELD

Embodiments relate to heat reflecting materials, and in particular, to materials that offer improved heat retention or reflective properties and limit heat conduction without compromising breathability.

BACKGROUND

Materials that provide improved insulation by reflecting body heat towards the body surface of a wearer often sacrifice moisture vapor transmission and result in low breathability. Such a reduction in moisture vapor transmission may cause the fabric to become damp, thereby causing discomfort and accelerating heat loss through heat conduction. Additionally, contact between heat-reflecting materials and the skin or underlying layer can undesirably allow the heat-reflecting materials to conduct body heat away from the skin, thus inadvertently accelerating heat loss.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1:
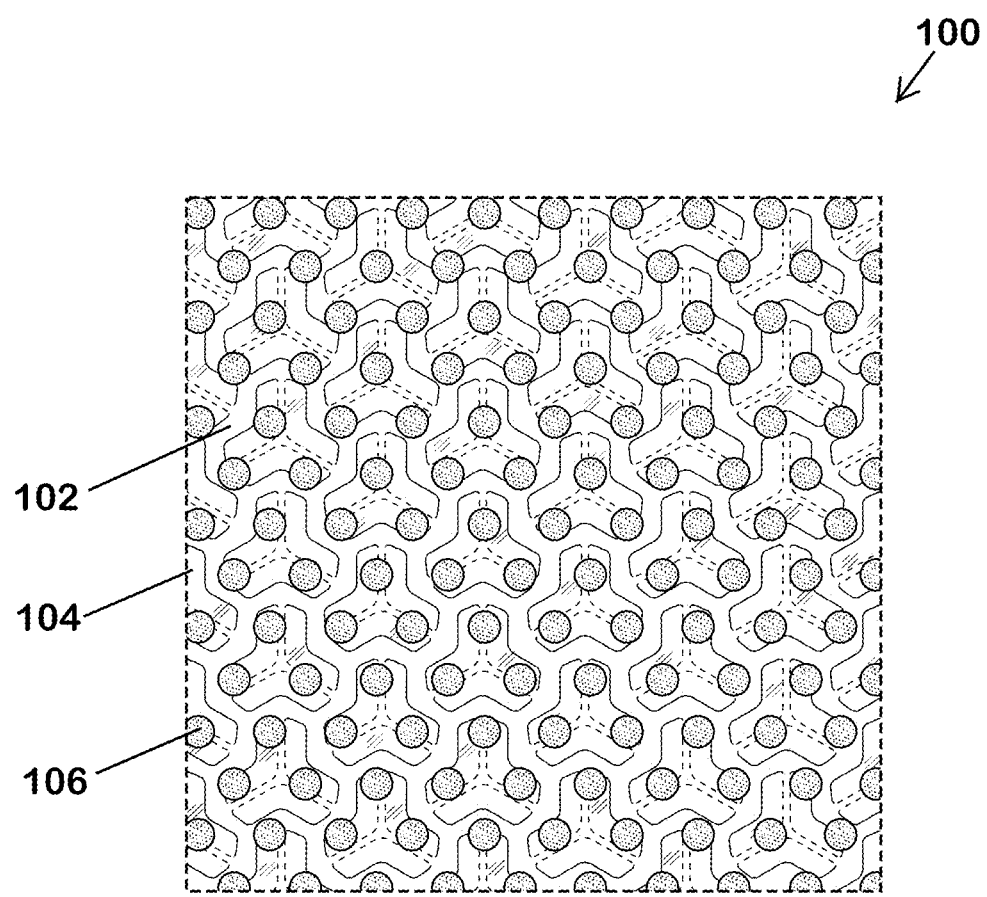
FIG. 1 illustrates a top view of one example of an insulating material, in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Embodiments herein provide insulating materials, for example, for body gear and outdoor gear, that provide improved heat reflection or retention and reduced heat conduction, while still providing excellent moisture vapor transmission.

In various embodiments, the insulating materials may include a base material, such as a fabric, having a moisture vapor transmission rate (MVTR) of at least 2000 g/m$^2$/24 h (JIS 1099 A1), such as at least 4000 g/m$^2$/24 h (JIS 1099 A1), at least 6000 g/m$^2$/24 h, or at least 8000 g/m$^2$/24 h. In various embodiments, the base material may be a mesh, foam, or leather. As used herein, the term "moisture vapor transmission rate (MVTR)" refers to a measure of the passage of water vapor through a material, such as a fabric. The term "breathable" is used herein to refer to a fabric that has an MVTR at or above 2000 g/m$^2$/24 h (JIS 1099 A1). In some embodiments, a breathable material allows for the passage of water vapor, but not liquid water. Although the term "breathable" is often assumed to also encompass air permeability, a "breathable" fabric does not necessarily have a high air permeability. Additional desirable characteristics of the base fabric may include water resistance, waterproofness, stretch, drape, and softness. In embodiments, a base material can be a woven or non-woven fabric, a knitted fabric, a foam, a mesh, a leather or other material used for the construction of an article of body gear and/or outdoor gear.

In various embodiments, a plurality of heat-reflecting elements may be coupled to a first side of the base material (for example, the side of the material that faces a user's body when the base fabric or other material is incorporated into body gear), and each heat-reflecting element may have a heat-reflecting surface and may be positioned to reflect heat towards a heat source, such as a user's body. Additionally, a plurality of spacer elements may be coupled to the first side of the base material. In various embodiments, each spacer element may maintain a space, such as an air space, between the first side of the base material, and may prevent or reduce contact between the heat-reflecting elements and an underlying surface, such as a base layer, intermediate layer of clothing, and/or a user's skin, thereby reducing heat conduction through the base material.

In various embodiments, each spacer element may project away from the first side of the base material at least 0.05-5.0 mm, such as about 0.05-2.0 mm. In various embodiments, the spacers may take any of a number of forms, and may in some examples be made from woven or non-woven pods, knitted material, foam elements, or vertically oriented fibers (VOF). In some embodiments, a spacer element made from vertically oriented fibers (e.g., a VOF element) may include a plurality of fibers that are oriented substantially perpendicular to the surface of the base material. In various embodiments, at least some of the plurality of spacer elements may at least partially overlay and/or overlap at least some of the plurality of heat-reflecting elements. In some embodiments, the spacer elements may completely overlap or partially overlap the heat-reflecting elements. In specific, non-limiting examples, the spacer elements may cover, overlay, or overlap about 2-40% of the surface area of the heat-reflecting elements, such as about 5-25%. In various embodiments, each spacer element may have a maximum dimension of about 1-6 mm, such as about 2-3 mm, and a center-to-center spacing of the spacer elements may be about 3-5 mm.

In various embodiments, the spacing and placement of both the heat-reflecting elements and the spacer elements may leave portions of the base material uncovered between adjacent elements, and these uncovered portions of the base material may provide moisture vapor transmission, resulting in a breathable material, such as a breathable fabric. In some embodiments, at least 15% of the base material may remain uncovered by both heat-reflecting elements and spacer elements, such as about 20%, about 30%, about 35%, or about 50%. In various embodiments, the heat-reflecting elements may cover a sufficient surface area of the base material to reflect a desired amount of heat, such as body heat, towards the body of a user, such as at least 30% of the base material.

In various embodiments, the spacer elements may provide enhanced insulation compared to base material alone. In various embodiments, the spacer elements may prevent or reduce contact between the heat-reflecting elements and an underlying surface, such as the surface of a base layer, or intermediate fabric or material layer, which may in turn reduce heat conduction by the heat-reflecting elements. Additionally, in various embodiments, the spacer elements may prevent or reduce contact between the heat-reflecting elements and the skin of a user, which may in turn reduce heat conduction by the heat-reflecting elements. In various embodiments, the spacer elements also may maintain space between the base material and an underlying surface, such as the surface of a base layer, or intermediate fabric or material layer, which may facilitate air flow and/or ventilation and enhance the sensation of breathability. In various embodiments, the spacer elements also may maintain space between the skin of a user and the base material, which may facilitate air flow and/or ventilation and enhance the sensation of breathability. Furthermore, the overlapping placement of the spacer elements and the heat-reflecting elements surprisingly does not reduce the amount of heat reflected by the heat-reflecting elements, or reduce the heat reflected as much as expected. In some embodiments, any loss of heat reflection may be more than offset by a corresponding decrease in heat conduction. In embodiments, a disclosed insulating material exhibits at least a 50% increase in insulation value over the base material from which it was constructed, for example at least 75%, at least 100%, at least 125%, at least 150%, at least 175%, at least 200%, at least 225% or even at least 250% greater insulation value over the value of the base material from which it was constructed, such as between about 50% and about 230% greater insulation value than the base material from which it was constructed, for example a material that does not include either heat-reflecting elements or spacer elements as described herein.

One of the most significant advantages of the disclosed materials is that the base material, such as base fabric, containing heat-reflecting elements and spacer elements, such as vertically oriented fiber elements, provides greater insulation than the base material alone by a surprising and unexpected amount. By adding the spacer elements and the heat-reflecting elements to the base material, heat is trapped and/or retained by the insulating material in a synergistic manner. As demonstrated in the Example below, and as specifically shown in Table 2, the inclusion of both spacer elements and the heat-reflecting elements to a base fabric has almost a two-fold increase over what would be expected from a simple linear addition of the effect of the spacer elements and the heat-reflecting elements alone. This synergistic effect provides for an insulating material that far exceeds expectations.

Figure 2:
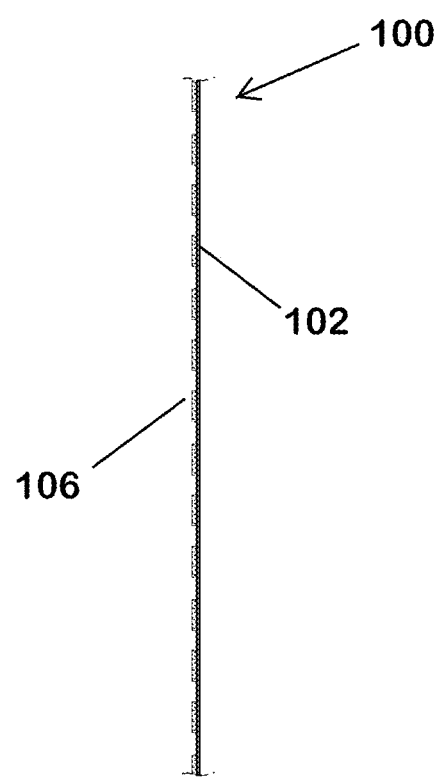
FIG. 2 illustrates a side view of the insulating material of FIG. 1, in accordance with various embodiments.
Figure 3:
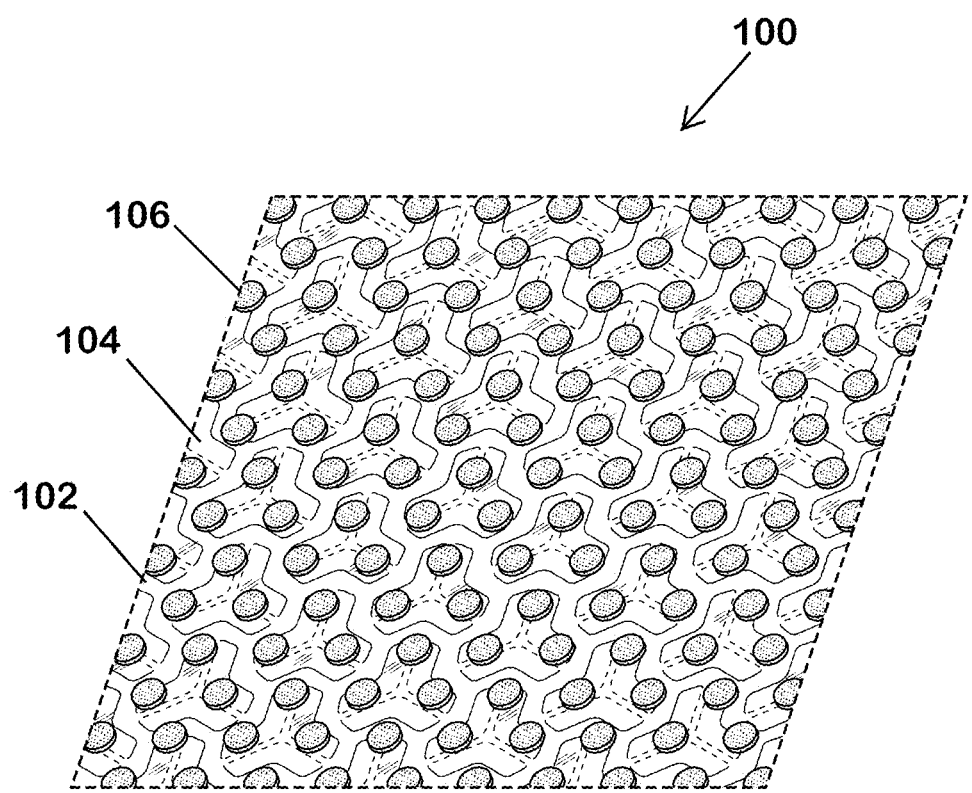
FIG. 3 illustrates a perspective view of the insulating material of FIG. 1, in accordance with various embodiments.

FIGS. 1, 2, and 3 illustrate a top view (FIG. 1), a side view (FIG. 2), and a perspective view (FIG. 3) of one example of an insulating material, in accordance with various embodiments. With reference to FIGS. 1, 2, and 3, the insulating fabric 100 may include a base material 102, such as a base fabric having an MVTR of at least 2000 g/m²/24 h, which may allow moisture vapor to move away from the user's body and through the base material so as to prevent moisture build up inside the body gear. Additionally, the base material 102 may have one or more additional functional characteristics that are appropriate for its intended use. The base material 102 may be made from any material or materials that provides the desired set of functional characteristics, feel, weight, thickness, weave, texture, and/or other desired property, and may include nylon, polyester, rayon, cotton, spandex, wool, silk, or a blend thereof. In specific, non-limiting embodiments, the base material may be a "performance" material, such as a performance synthetic knit or woven material that has a high MVTR (for example, at least 2000 g/m²/24 h, JIS 1099 A1) and an air permeability of above 10-30 CFM on a Frazier device. In some embodiments, the first side of the base material may be flat for easier application of the heat-reflecting elements and/or spacer elements.

With continued reference to FIGS. 1, 2, and 3, the insulating material 100 also may include a plurality of heat-reflecting elements 104 coupled to a first side of the base material 102. As used herein, the term "first side" refers to the side of the base material 102 that is intended to face the user's body when the base material 102 is incorporated into body gear, whether that side contacts the user's body (such as when the insulating material 100 is used as the innermost or only layer in an article of body gear), or not (such as when the insulating material 100 is incorporated into the article of body gear as an intermediate or outermost layer). In various embodiments, each heat-reflecting element 104 may have a heat-reflecting surface and may be positioned to reflect heat towards the user's body.

As used herein, the term "heat-reflecting element" refers to a unitary element having a surface that reflects electromagnetic radiation having longer wavelengths than those of visible light (e.g., the infrared range, which extends from the nominal red edge of the visible spectrum at 700 nanometers (frequency 430 THz), to 1 mm (300 GHz) for the purpose of this disclosure). This range includes most of the thermal radiation emitted by objects near room temperature. In various embodiments, the heat-reflecting elements also may reflect electromagnetic radiation in other parts of the spectrum, such as the visible spectrum. In various embodiments, the heat-reflecting elements are formed from a metallic plastic or a foil, such as a film vacuum-metallized with aluminum. Various embodiments may include a film vacuum-metallized with aluminum which is coated with a thin lacquer. In various embodiments, the thin lacquer overcoat may contain pigments or dyes to modify the reflection of electromagnetic radiation in the visible range, thereby modifying the color of the reflective foil, while at the same time not significantly reducing the reflectance of electromagnetic radiation in the thermal IR range (5 to 35 microns). For example, the pigmented foil may be less than 1% lower thermal IR reflectance than the non-pigmented foil, less than 2% lower thermal IR reflectance than the non-pigmented foil, or less than 5% thermal IR reflectance than the non-pigmented foil. Generally, the heat-reflecting elements may include aluminum, silver, or any other heat-reflecting metal, or more generally, a low-emissivity heat reflective material. In particular embodiments, the heat reflecting elements may have an emissivity of no higher than 0.1, such as no higher than 0.08, no higher than 0.06, or no higher than 0.04.

In various embodiments, the heat-reflecting elements may cover 30-70% of the base material (e.g., the surface area ratio of heat-reflecting elements to base material may be from 7:3 to 3:7), such as 40-60% (e.g., a surface area coverage ratio of from 4:6 to 6:4). In various embodiments, the heat-reflecting elements may be coupled to the base material with an adhesive. In various embodiments, the heat-reflecting elements and/or spacer elements may be coupled to the base material with a glue or an adhesive, such as a urethane or acrylate-based adhesive. In some embodiments, the glue or adhesive may be adsorbent or absorbent, for example to aid in moving moisture outward from the body.

In various embodiments, the heat-reflecting elements may be applied in a pattern or a continuous or discontinuous array, such as a repeating or non-repeating pattern of separate, discrete elements (e.g., dots, rings, lines, stripes, waves, triangles, squares, hexagons, stars, ovals, or other geometric patterns or shapes, or logos, words, etc.) or a repeating or non-repeating pattern of interconnected elements (such as a lattice). In various embodiments, a pattern of heat-reflecting elements may be symmetric, ordered, random, and/or asymmetrical. Further, the pattern, size, shape, or spacing of the heat-reflecting elements may differ at strategic locations in the body gear as dictated by the intended use of the article of body gear.

In various embodiments, the size of the heat-reflecting elements may be largest (or the spacing between them may be the smallest) in the core regions of the body for enhanced heat reflection in those areas, and the size of the heat-reflecting elements may be the smallest (or the spacing between them may be the largest) in peripheral areas of the body. In other embodiments, the size of the heat-reflecting elements may be smallest (or the spacing between them may be the largest) in the core regions of the body, and the size of the heat-reflecting elements may be the largest (or the spacing between them may be the smallest) in peripheral areas of the body for enhanced heat reflection in those areas. In some embodiments, the degree of coverage by the heat-reflecting elements may vary in a gradual fashion over the entire garment as needed for regional heat management. In some embodiments, reducing the area of individual elements, but increasing the density may provide a better balance between heat reflection and base material functionality. In some embodiments, the surface area of individual heat-reflecting elements may be less than 1 cm². In various embodiments, each heat-reflecting element may have a maximum dimension (diameter, hypotenuse, length, width, etc.) that is less than or equal to about 1 cm, such as 4 mm, or 1 mm.

With continued reference to FIGS. 1, 2, and 3, in certain specific, non-limiting examples, the insulating material also may include a plurality of vertically oriented fiber (VOF) elements 106 coupled to the first side of the base material 102, and each VOF element 106 may include a plurality of fibers that are oriented substantially perpendicular to the surface of the base material. As used herein, the term "VOF element" refers to a unitary element having a plurality of substantially perpendicular fibers. In various embodiments, the VOF elements may be discrete pods that contain a high density of vertically oriented fibers, such as at least 200 VOF fibers for a high denier, fairly coarse fiber. In various embodiments, the fibers may comprise nylon, polypropylene, or polyester. In various embodiments, the fibers may include nylon, rayon, polyester, and/or cotton fibers. The fibers may be wicking fibers in some embodiments. As defined herein, the term "wicking" refers to a fiber that allows transport of a fluid along its length, which for a VOF fiber means generally perpendicular to the plane of the base material. In various embodiments, the VOF elements and/or the individual fibers may be coupled to the base material with an adhesive. In other embodiments, the VOF fibers may be integrated into the material by embroidering, weaving, or knitting.

In various embodiments, the vertically oriented fibers may have an average length of 0.2-2.0 mm, such as about 0.6 mm, and an average linear density of 0.9-22 dtex, such as 1.7 dtex. In various embodiments, the fibers may be selected and arranged to maximize capillary forces between the fibers.

The VOF elements may be applied in a pattern or a continuous or discontinuous array, such as a repeating or non-repeating pattern of separate, discrete elements (e.g., dots, rings, lines, stripes, waves, triangles, squares, hexagons, stars, ovals, or other geometric patterns or shapes, or logos, words, etc.) or a repeating or non-repeating pattern of interconnected elements (such as a lattice). In various embodiments, a pattern of VOF elements may be symmetric, ordered, random, and/or asymmetrical. Further, the pattern, size, shape, or spacing of the VOF elements may differ at strategic locations in the article, such as body gear, as dictated by the intended use of the article.

In various embodiments, at least a portion of the base material remains uncovered between adjacent heat-reflecting elements, and between adjacent VOF elements. Additionally, at least a portion of the base material may remain uncovered between both types of elements, such as at least 10-25%.

In various embodiments, the VOF elements may prevent or reduce contact between the heat reflecting elements and the underlying surface, such as a base layer or body surface. In various embodiments, the insulating material (including the base material, heat-reflecting elements, and VOF elements) may have a MVTR of at least 2000 g/m$^2$/24 h (JIS 1099 A1). The insulating material may form all or a part of any article, such as used as body or outdoor gear, for example a coat, jacket, shirt, shoe, boot, slipper, base layer, glove, mitten, hat, scarf, pants, sock, tent, backpack or sleeping bag. In certain embodiments the heat-reflecting elements and the spacer element are positioned on the innermost surface of an article, for example on the innermost surface of a base layer, such as the innermost surface of a base layer facing toward the skin of a subject.

Figure 4:
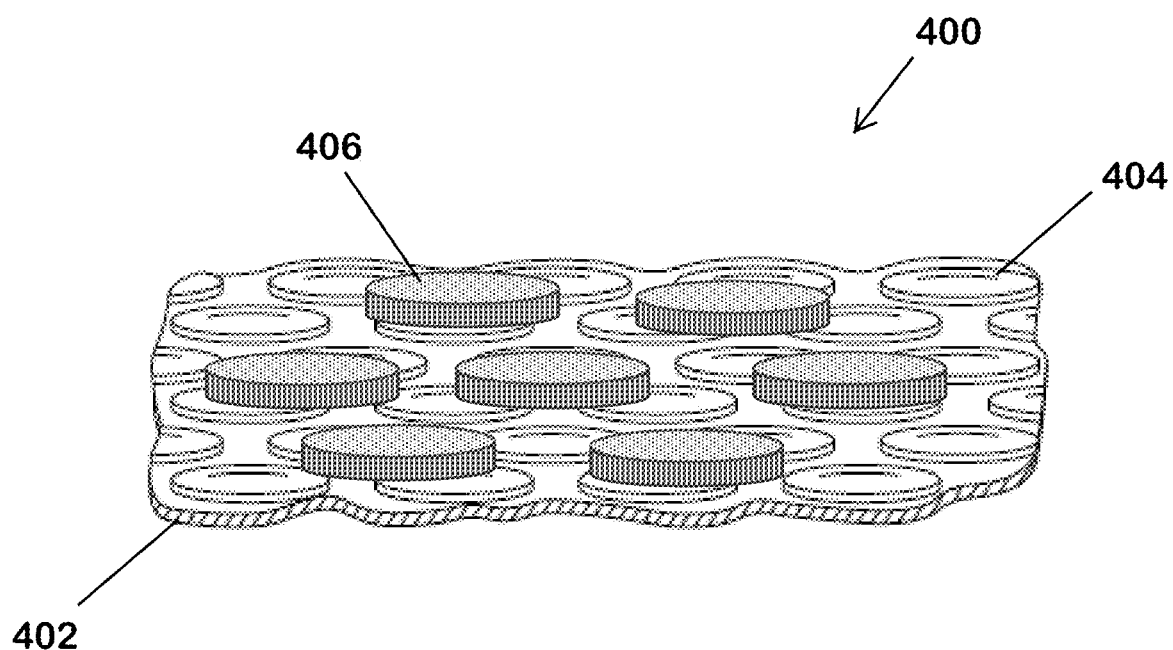
FIG. 4 illustrates a perspective view of a second example of an insulating material, in accordance with various embodiments.

FIG. 4 illustrates a perspective view of a second example of an insulating material 400, including a base material 402, a plurality of heat-reflecting elements 404, and a plurality of VOF elements 406, in accordance with various embodiments. As illustrated, in some embodiments at least a portion of the VOF elements 406 may overlap with and/or overlay at least a portion of the heat-reflecting elements 404.

Figure 5:
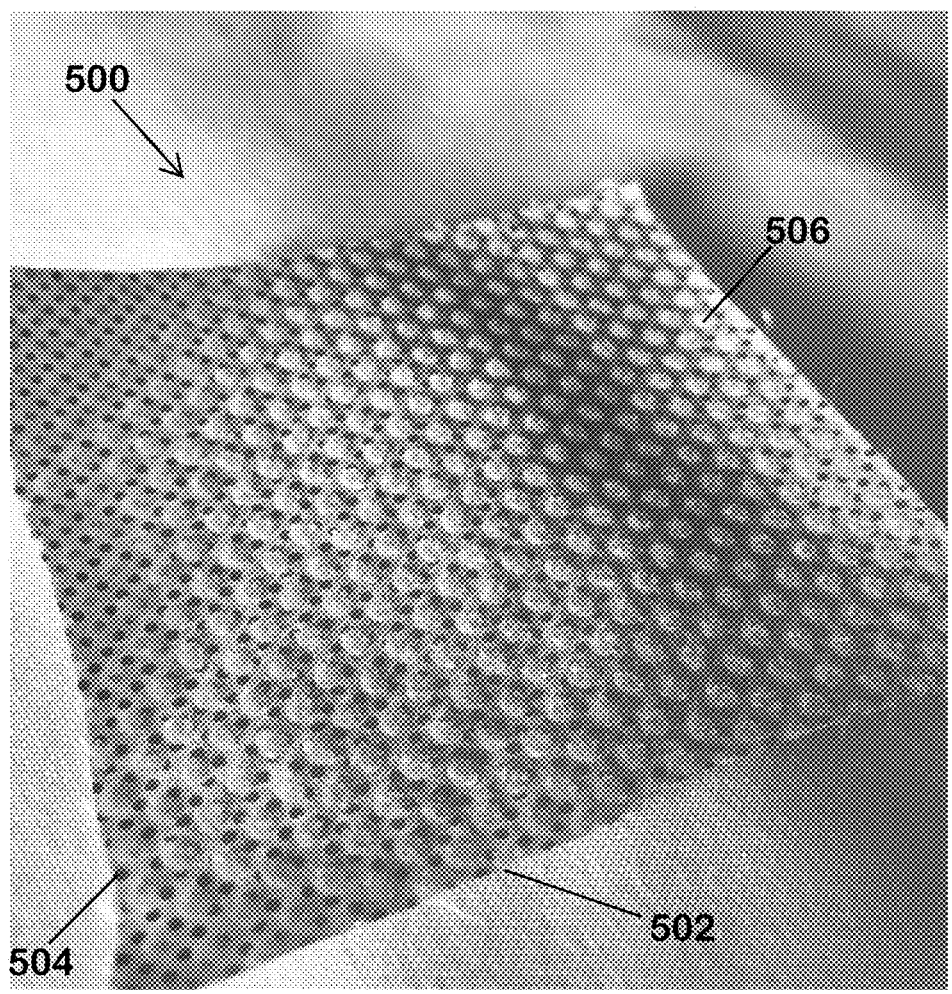
FIG. 5 is a digital image of a third example of an insulating material, in accordance with various embodiments.
Figure 6:
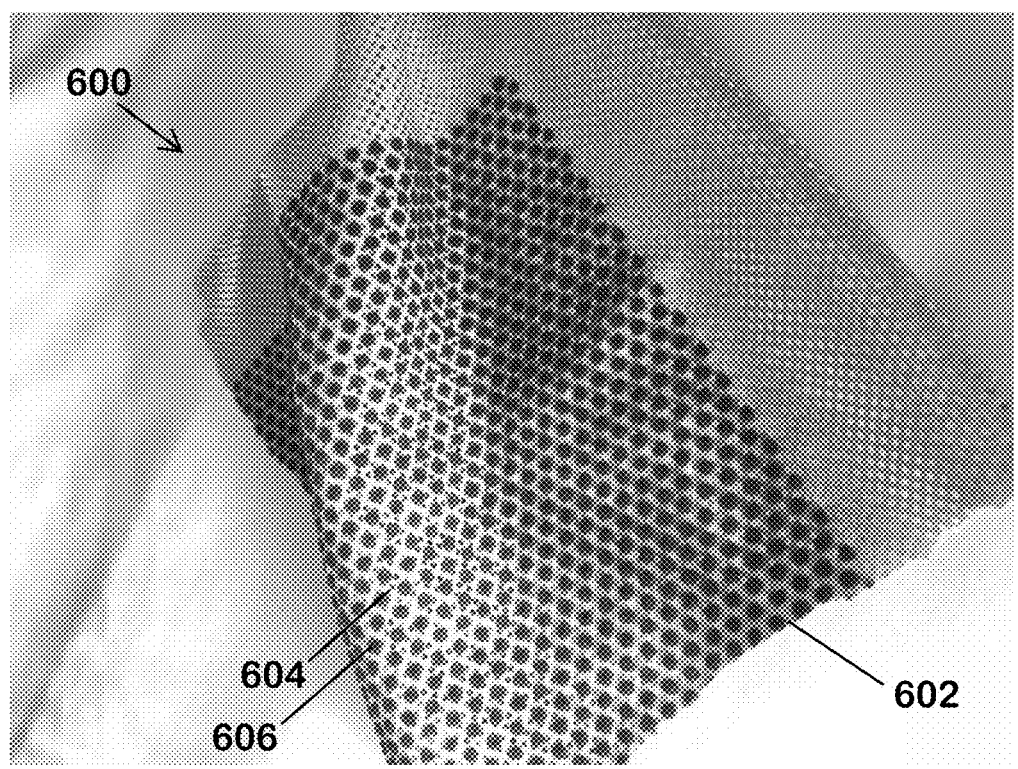
FIG. 6 is a digital image of a fourth example of an insulating material, in accordance with various embodiments.

FIG. 5 is a digital image of a third example of an insulating material 500, including a base material 502, a plurality of heat-reflecting elements 504, and a plurality of VOF elements 506; and FIG. 6 is a digital image of a fourth example of an insulating material 600, including a base material 602, a plurality of heat-reflecting elements 604, and a plurality of VOF elements 606, in accordance with various embodiments. In some embodiments, the VOF elements 606 may include dyed or pigmented fibers.

FIGS. 7A, 7B, 7C, and 7D are heat escape maps measured with an IR thermal imaging camera, for base material with VOF elements (FIG. 7A), base material alone (FIG. 7B), base material with heat-reflecting elements (FIG. 7C), and base material with heat-reflecting elements and VOF elements (FIG. 7D), in accordance with various embodiments. These images were measured on circular material samples (approx. 6.9-cm-diameter) placed face down on an insulated hot plate assembly using a FLIR SC83000 HD Series high speed MWIR megapixel infrared camera. The insulated hot plate assembly consisted of a 0.125" thick 6061 aluminum alloy plate as the test surface, which was placed on top of a silicone resistive heating pad (McMaster-Carr p/n 35765K708), which was on top of 2" thick cork insulation. The test surface plate had slots cut into it in a rectangular shape to produce a uniform temperature on the test surface. The test surface was also painted matte black to approximate the emissivity of skin ($\varepsilon_{skin}$=0.95≈$\varepsilon_{black\ paint\ (Parsons)}$=0.98). A variable transformer was adjusted to provide a steady-state surface temperature. (See, e.g., Incropera, F., DeWitt, D., Bergman, T., and Lavine, A., *Fundamentals of Heat and Mass Transfer*, 6$^{th}$ Edition, John Wiley & Sons, 2007.)

Also disclosed in various embodiments are methods of making an insulating material, which methods generally include coupling a plurality of heat-reflecting elements to a first side of a base material having a moisture vapor transfer rate (MVTR) of at least 2000 g/m$^2$/24 h (JIS 1099 A1), each of the heat-reflecting elements having a heat-reflecting surface; and coupling a plurality of vertically oriented fiber (VOF) elements to the first side of the base material such that at least some of the plurality of VOF elements at least partially overlay at least some of the plurality of heat-reflecting elements. Each VOF element includes a plurality of fibers oriented substantially perpendicular to a surface of the base material.

In various embodiments, the heat-reflecting elements are coupled to the base material before the VOF elements are coupled to the base material. The heat-reflecting elements may be permanently coupled to the base material in a variety of ways, including, but not limited to laminating, gluing, heat pressing, printing, or welding, such as by hot air, radiofrequency or ultrasonic welding.

In various embodiments, the plurality of VOF elements may then be coupled to the first side of the base material by screen or gravure printing an adhesive followed by electrostatic deposition of short fibers. Other methods to add VOF elements include embroidering, weaving and knitting. For instance, in some embodiments, an adhesive, such as a single part or two-part catalyzed adhesive may be used to couple the VOF elements to the base material. The adhesive may be applied to the base material in a desired pattern using a printing process, and the fibers may then be deposited electrostatically on the base material. Un-adhered fibers may then be removed from the base material by vacuum.

In one specific, non-limiting example, the fibers may be dispensed from a hopper through a positive electrode grid, which may orient the fibers and accelerate them towards the base material surface. A grounded electrode may be positioned under the material surface, and the fibers may be vertically embedded in the adhesive in the areas in which it was applied to the base material, creating a plurality of VOF elements.

In another specific, non-limiting example, the adhesive may instead be applied to a transfer membrane, and the fibers may be electrostatically embedded in the adhesive on the transfer membrane, creating a plurality of VOF elements. The transfer membrane may then be used to apply the VOF elements to the base material.

Figure 8:
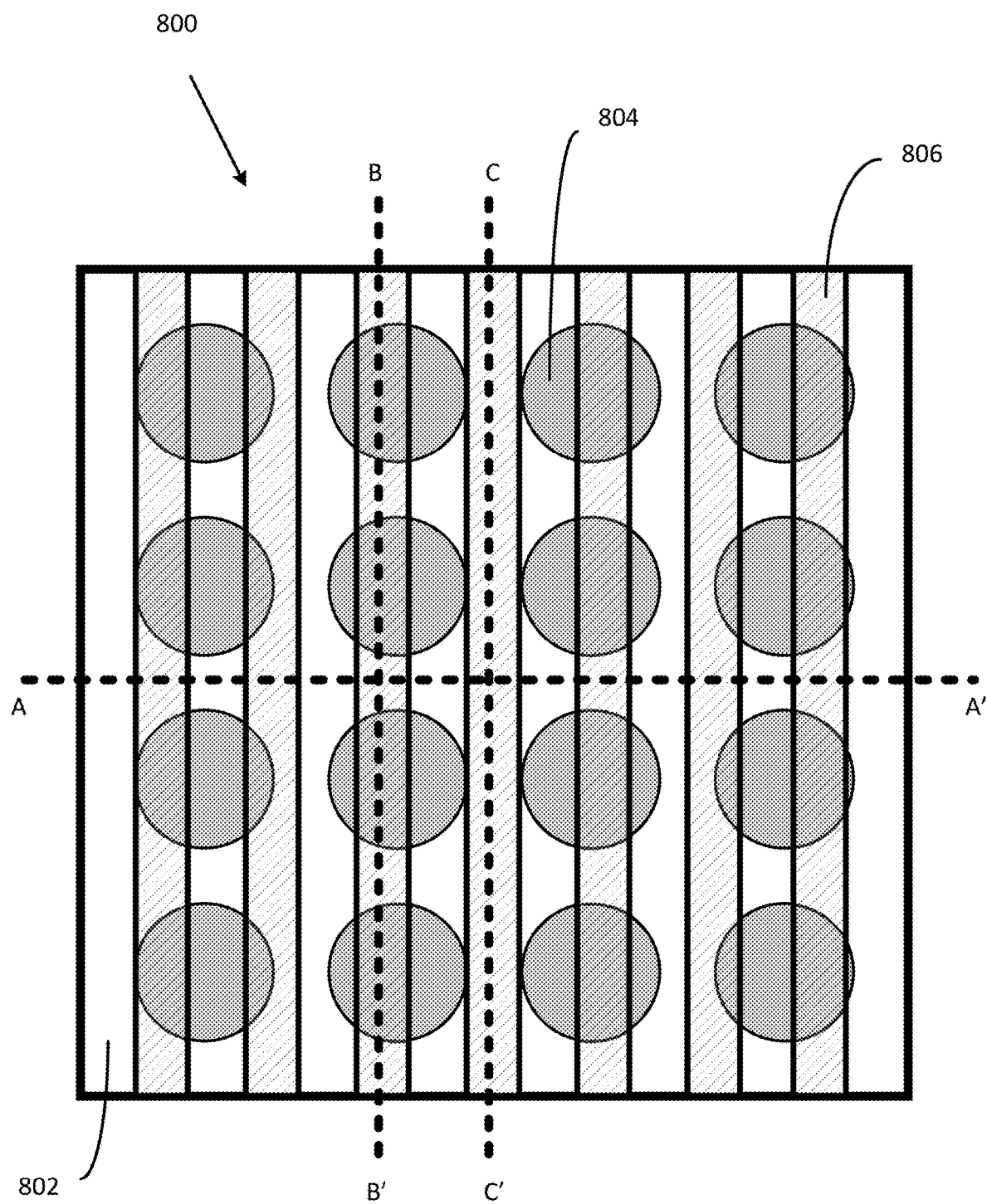
FIG. 8 illustrates a top view of an alternative insulating material that includes a foam-based spacer material, in accordance with various embodiments.

As previously noted, in some embodiments the spacer material may be formed of a foam or a foam-like material (collectively referred to herein as a "foam-based spacer material"). FIG. 8 illustrates a top view of an alternative insulating material 800 that includes a foam-based spacer material, in accordance with various embodiments.

Specifically, the insulating material 800 may include a base material 802 and one or more heat-reflecting elements 804, which may be respectively similar to base material 102 and heat-reflecting element 104. The insulating material 800 may also include a foam-based spacer material 806 as shown in FIG. 8. It will be noted that the foam-based spacer material 806 is depicted as at least partially transparent for the sake of showing the overlap between the spacer material 806 and the heat-reflecting elements 804, however, in other embodiments the foam-based spacer material would be opaque.

In some embodiments, the foam-based spacer material 806 may be or may include a material such as a polyacrylate, polyurethane, polyolefin, and/or blends or copolymers of such materials. In some embodiments, these base polymers may be compounded with a crosslinking agent and a blowing agent to create the foaming formulation. Such a crosslinking agent may be or include a peroxide-based crosslinking agent. The foaming formulation may contain a colorant, for example a dye or pigment. The foaming formulation may additionally contain a viscosity modifier as needed. The foaming formulation may be applied directly to a fabric surface via rotary or flat screen printing, gravure printing, coating, or some other technique. However, it will be understood that such material(s) are intended only as example materials, and in other embodiments the foam-based spacer material 806 may be or may include one or more additional or alternative materials. Additionally, in some embodiments, the foam-based spacer material 806 may have a thickness of approximately 0.1 millimeters (mm), but in other embodiments the thickness may be more or less. For example, in some embodiments the thickness may be between approximately 0.05 mm and approximately 0.15 mm (or higher). As used in this example, the term "thickness" refers to the maximum distance that the foam-based spacer material 806 extends when measured from the underlying surface of the base material 802.

As may be seen, in some embodiments the foam-based spacer material 806 may at least partially overlap one or more of the heat-reflecting element(s) 804. In some embodiments, the foam-based spacer material 806 may be configured in a generally linear fashion, as shown in FIG. 8. In other embodiments, the foam-based spacer material 806 may be configured in a cross-hatch pattern, a circular pattern, a hexagonal pattern, a random or pseudo-random pattern, or some other pattern. It will be understood that the specific depicted dimensions of both the heat-reflecting elements 804 and the foam-based spacer material 806 are intended as one example of such dimensions, and in other embodiments the heat-reflecting elements 804 and/or the foam-based spacer material 806 may have a different shape, configuration, or dimensions than shown in FIG. 8.

In some embodiments, the insulating material 800 may not include the heat-reflecting elements 804. Rather, the foam-based spacer material 806 may be used directly with the base material 802. Such an embodiment may be desired if the foam-based spacer material 806 alone provides sufficiently improved thermal performance without the need to apply the heat-reflecting element, thereby eliminating the materials, processing and cost of adding the heat-reflecting elements. Such an embodiment may be possible by employing a foam formulation that leads to a closed-cell foam spacer material that also converts the underlying base fabric from an essentially two-dimensional material to a three-dimensional material via "rippling". The resulting structure may lead to improved thermal performance by (a) trapping of air in the spaces between the substrate and an underlying material (the spacer effect, which is also active when the heat-reflecting elements are present; (b) elimination of free and forced convection of the air trapped within the cells of the closed-cell foam structure; and (c) trapping of additional air due to the "rippled" three-dimensional topography of the composite material.

Figure 9:
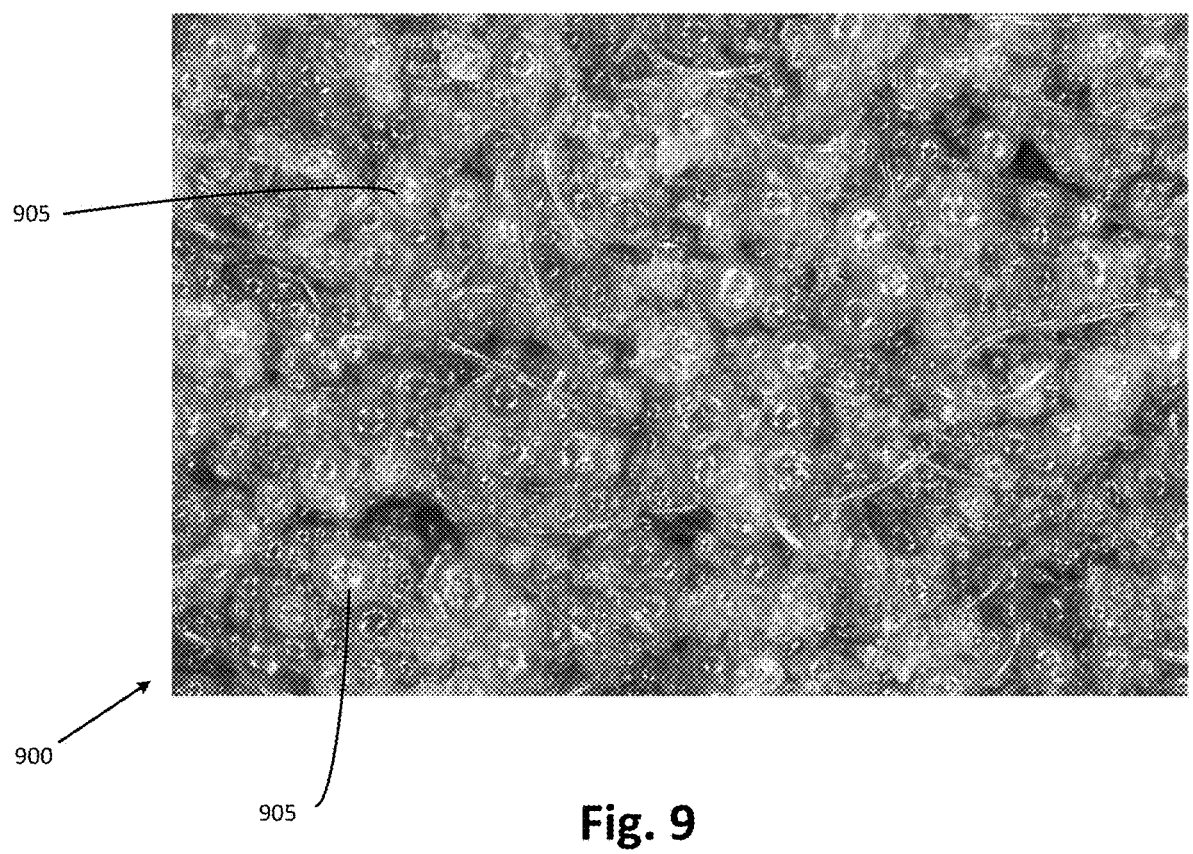
FIG. 9 illustrates an example digital image of a foam-based spacer material, in accordance with various embodiments.

FIG. 9 illustrates an example digital image 900 of a foam-based spacer material, in accordance with various embodiments. Specifically, FIG. 9 depicts a view 900 of such a foam-based spacer material (similar to foam-based spacer material 806) that has a closed-cell structure as described above. The existence of individual cells 905 may be seen at various areas of the view 900.

As previously described, the inclusion of a spacer may provide the benefit of providing additional insulation between base material 802 and/or heat-reflecting elements (e.g., heat-reflecting elements 804) and the skin, or underlying clothing layer, of a user of a wearable garment that includes the insulating material 800. If the spacer is a closed-cell-foam-based spacer material 806, then the foam inherently includes air pockets that, when heated, will remain in place (e.g., hot air rises) and thereby provide enhanced heat retention compared to open-cell foams or more generally, open-cell structures such as fabrics and traditional insulation materials such as down or those based on synthetic fibers and their combinations.

In some embodiments, the application of the foam-based spacer material to the base material may cause a change in the base material. For example, in some embodiments the foam-based spacer material may be attached to the base material (and/or one or more intervening heat-reflecting elements) through the use of an adhesive material such as a glue-type material, an epoxy-type material, etc. In other embodiments, the foam-based spacer material may be deposited onto the base material (and/or one or more intervening heat-reflecting elements) and then cured. Such a curing process may be performed using one or more of a chemical curing agent, heat, radiation (e.g., ultraviolet or infrared-based curing), light in the visible spectrum, and/or some additional or alternative curing technique. In this embodiment, the foam-based spacer material may at least partially shrink or contract, which may result in a change to the structure of the underlying base material.

Figure 10:
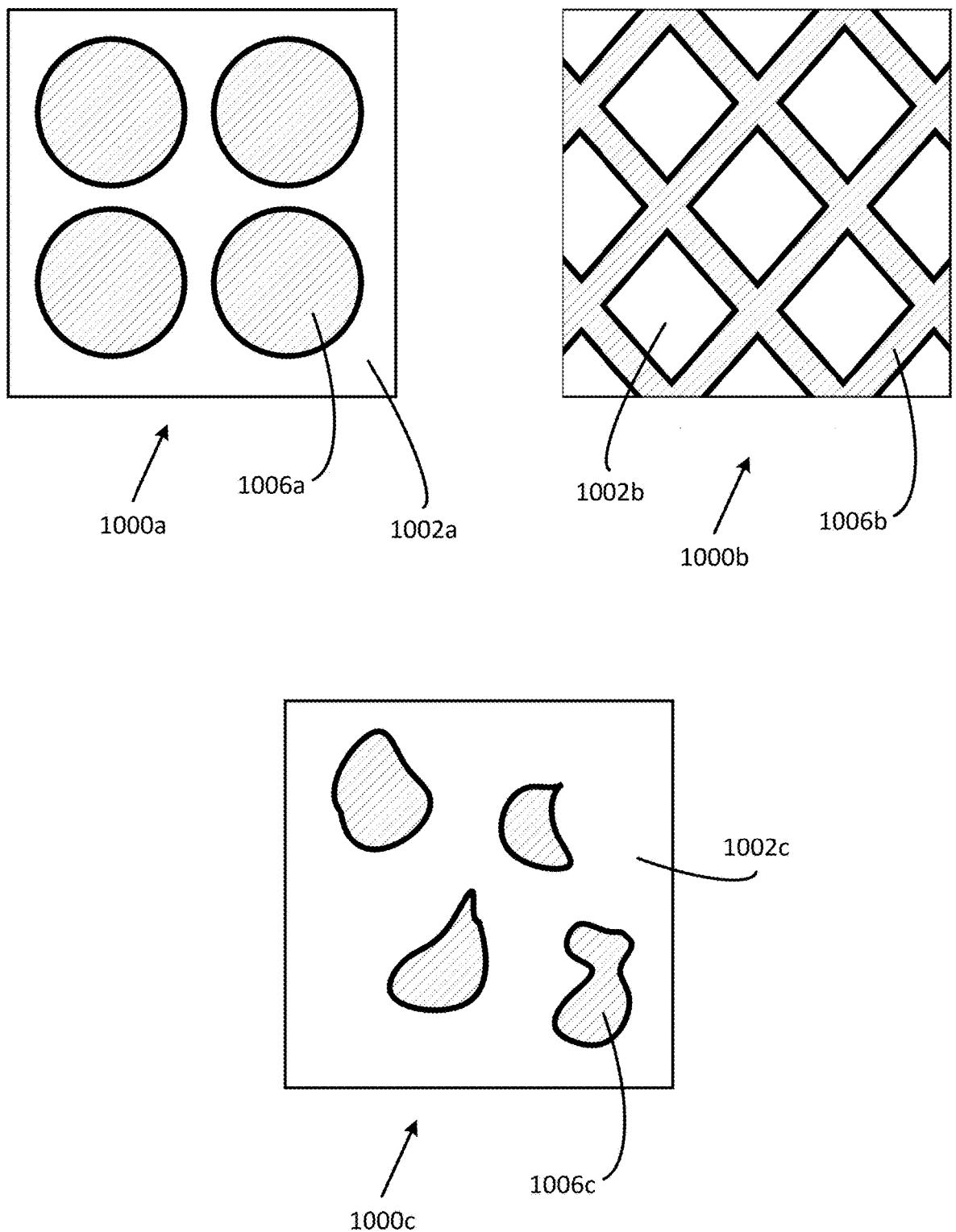
FIG. 10 illustrates a simplified top view of alternative configurations of a foam-based spacer material, in accordance with various embodiments.

As previously noted, in some embodiments a foam-based spacer material such as the foam-based spacer material 806 may be configured in a cross-hatch pattern, a circular pattern, a hexagonal pattern, a random or pseudo-random pattern, or some other pattern. FIG. 10 illustrates a simplified top view of alternative configurations of a foam-based spacer material, in accordance with various embodiments. It will be noted that FIG. 10 is intended as a simplified high-level figure with the purpose of depicting possible configurations of the foam-based spacer material.

In one embodiment, an insulating material 1000a may include a base material 1002a and foam-based spacer material 1006a. In another embodiment, an insulating material 1000b may include a base material 1002b and a foam-based spacer material 1006b. In another embodiment, an insulating material 1000c may include a base material 1002c and a foam-based spacer material 1006c. Generally, the base materials 1002a, 1002b, and 1002c may be similar to base material 802. Similarly, foam-based spacer materials 1006a, 1006b, and 1006c may be similar to foam-based spacer material 806.

As may be seen in FIG. 10, in one embodiment the foam-based spacer material 1006a may have a circular pattern. In another embodiment, the foam-based spacer material 1006b may have a cross-hatch pattern. In another embodiment, the foam-based spacer material 1006c may have a non-uniform random or pseudo-random pattern. It will be understood that these patterns are intended as examples of possible patterns for the sake of discussion, and other patterns may additionally or alternatively be used, with or without heat-reflecting elements.

Figure 11:
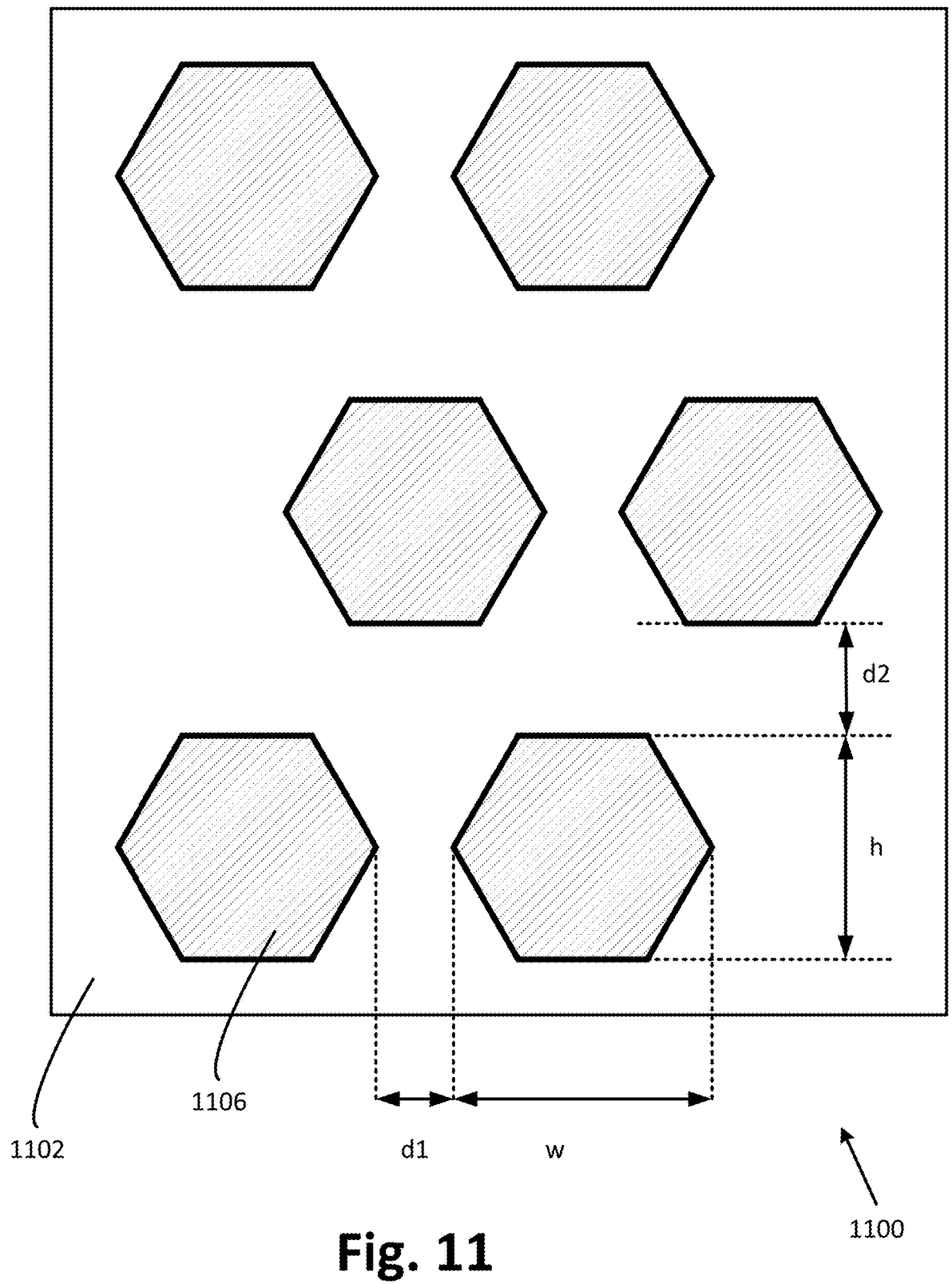
FIG. 11 illustrates a simplified top view of an alternative configuration of a foam-based spacer material, in accordance with various embodiments.

In some embodiments, the foam-based spacer material may have a generally hexagonal shape. FIG. 11 illustrates a simplified top view of an alternative configuration of a foam-based spacer material, in accordance with various embodiments. Specifically, FIG. 11 depicts an insulating material 1100 that includes a base material 1102 and foam-based spacer material 1106, which may be respectively similar to insulating material 800, base material 802, and foam-based spacer material 806.

As may be seen in FIG. 11, the foam-based spacer material 1106 may have a general hexagonal form. Additionally, in some embodiments the different foam-based spacer materials 1106 may be spaced apart from one another as shown in FIG. 11. In this embodiment, respective ones of the foam-based spacer materials 1106 may have a width w of approximately 8 mm. Additionally, respective ones of the foam-based spacer materials 1106 may have a height h of approximately 6 mm. The foam-based spacer materials 1106 may be spaced apart from one another by a distance d1 that is approximately 2.5 mm, and a distance d2 that is approximately 3 mm.

It will be understood that this embodiment is intended as an example configuration, and in other embodiments the width w, height h, and distances d1 and/or d2 may be different. Additionally, the configuration of the foam-based spacer materials 1106 with respect to one another (e.g., the "staggered" type pattern where spacer materials of different rows are offset from one another) may be different in other embodiments. Additionally, the orientation of the respective foam-based spacer materials 1106 may be different in other embodiments such that each of the foam-based spacer materials 1106 may not be oriented in the same direction as one another. Other variations may be present in other embodiments.

Figure 12:
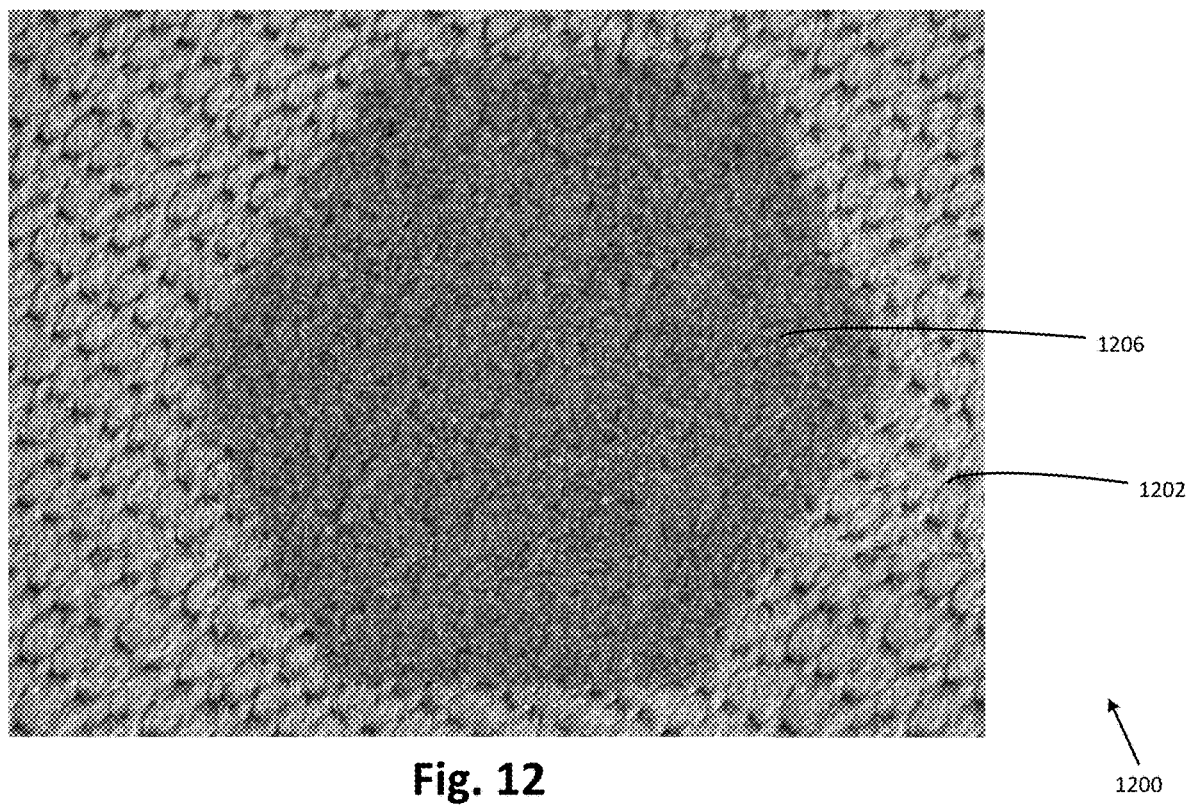
FIG. 12 illustrates a digital image of a foam-based spacer material, in accordance with various embodiments.

FIG. 12 illustrates an example digital image of a foam-based spacer material, in accordance with various embodiments. Specifically, FIG. 12 illustrates an example insulating material 1200 that includes a base material 1202 and a foam-based spacer material 1206, which may be respectively similar to base material 1102 and foam-based spacer material 1106.

Figure 13:
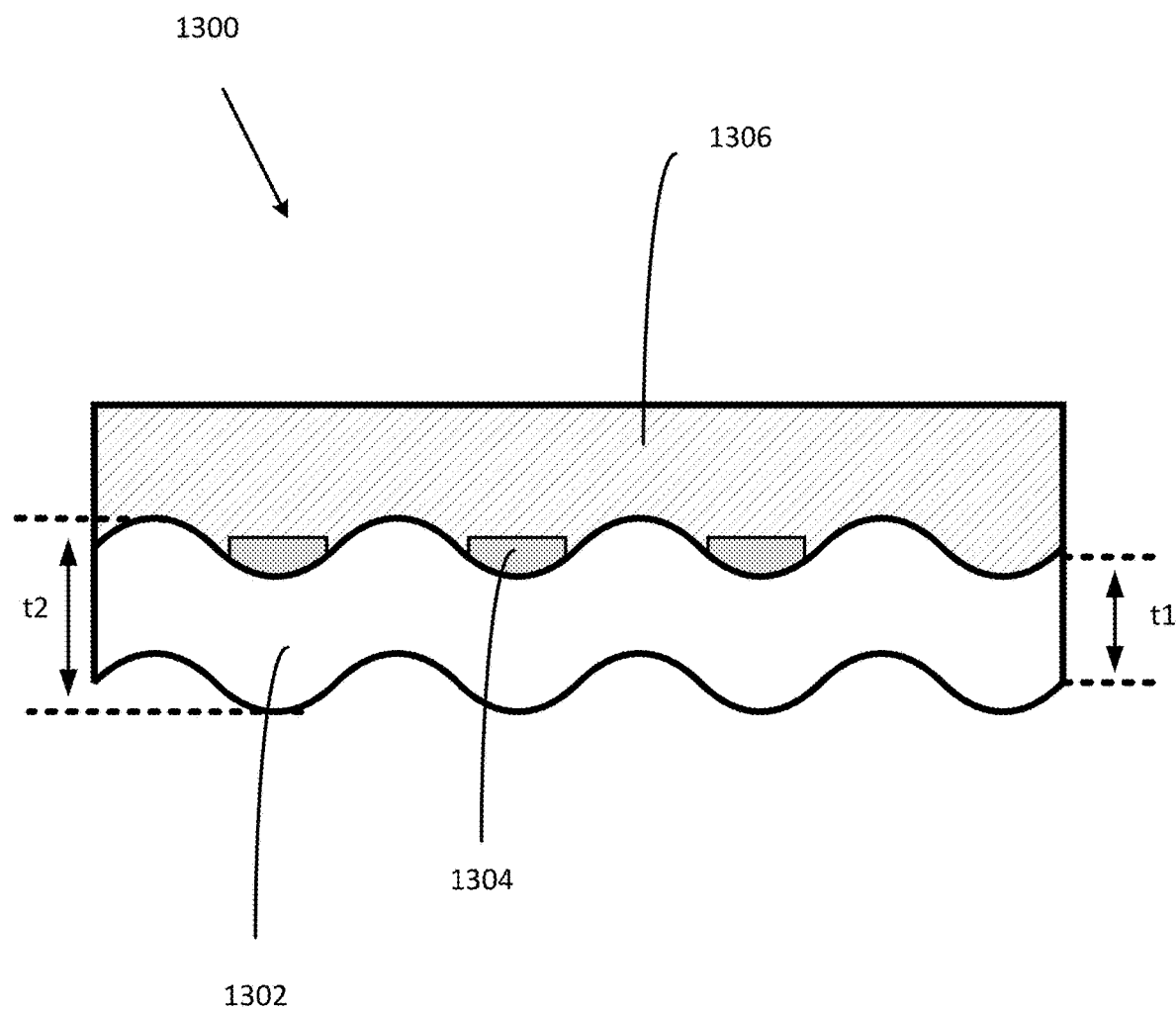
FIG. 13 illustrates an example side view of an alternative insulating material that includes a foam-based spacer material, in accordance with various embodiments.

FIG. 13 illustrates an example side view of an alternative insulating material 1300 that includes a foam-based spacer material, in accordance with various embodiments. In this embodiment, the insulating material 1300 may include a base material 1302, one or more heat-reflecting elements 1304, and a foam-based spacer material 1306, which may be respectively similar to elements 802, 804, and 806. It will be understood that the embodiment of FIG. 13 is intended as a simplified depiction for the purposes of discussion, and includes several areas of uniformity (e.g., the generally straight configuration of the foam-based spacer material 1306 or the uniform rippling of the based material 1302) that may not be present in real-world implementations of embodiments of the present disclosure. Additionally, although the heat-reflecting elements 1304 are depicted in certain locations of the rippled base material 1302, in other embodiments at least one of the heat-reflecting elements 1304 may be located at a different portion of the base material 1302 with respect to the "ripple" of the base material 1302.

Generally, FIG. 13 depicts a "rippling" of the base material 1302, which may result from the curing process of the foam-based spacer material 1306. This rippling may be because, for example, the foam-based spacer material 1306 may shrink during the curing process, causing the base material 1302 to "bunch up" or ripple. In some embodiments, the rippling may be beneficial because it may introduce extra distance (and therefore increased insulation) between the skin of a user of a garment that includes the insulating material 1300 and at least portions of the base material 1302. Specifically, as may be seen, the base material 1302 itself may have a thickness t1. However, due to the rippling effect of the base material 1302, the base material 1302 may have a functional thickness t2 that is greater than t1. In some embodiments, t1 may be on the order of approximately 0.68 mm. Similarly, in some embodiments t2 may be on the order of approximately 0.84 mm. This additional functional thickness t2>t1 may contribute to the above-described increased insulation.

Figure 14:
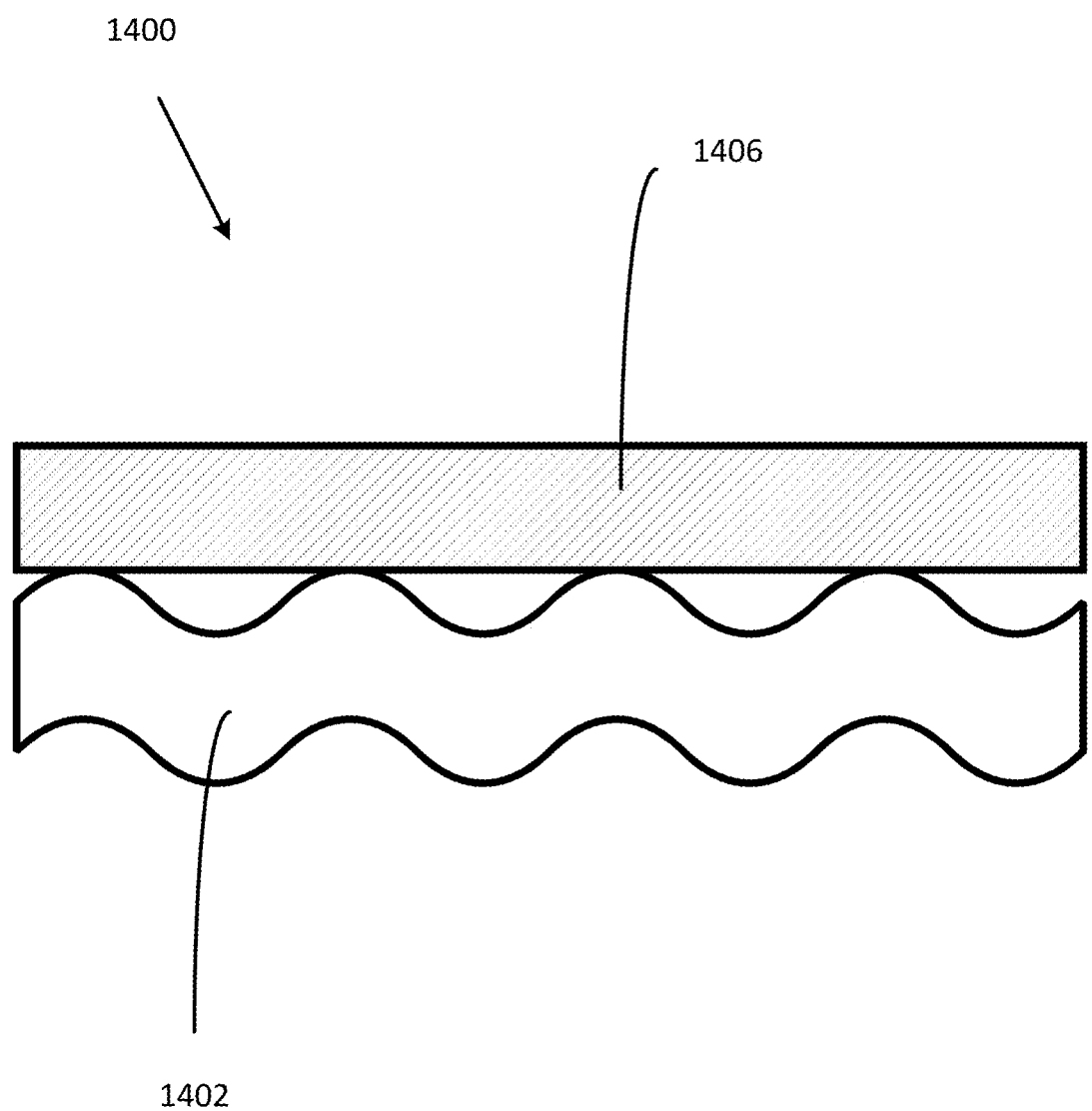
FIG. 14 illustrates an example side view of an alternative insulating material that includes a foam-based spacer material, in accordance with various embodiments.

FIG. 14 illustrates a side view of an alternative insulating material 1400 that includes a foam-based spacer material, in accordance with various embodiments. In this embodiment, the insulating material 1400 may include a base material 1402 and a foam-based spacer material 1406, which may be respectively similar to elements 1302 and 1306. It will be additionally noted that, in this example embodiment, the heat-reflecting elements (e.g., elements similar to heat-reflecting elements 1304) may not be present. For example, in this embodiment the rippled base material 1402 and the foam-based spacer material 1406 may provide a desirable amount of heat-retention such that additional heat-reflecting elements are un-necessary as described above. It will be understood that, similarly to FIG. 13, the embodiment of FIG. 14 is intended as a highly simplified depiction for the purposes of discussion, and includes several areas of uniformity or placement of certain elements that may not be present in real-world implementations of embodiments of the present disclosure.

Similarly to FIG. 13, FIG. 14 depicts a "rippling" of the base material 1402, which may result from the curing process of the foam-based spacer material 1406. This rippling may generate one or more cavities, as may be seen.

The alteration to the configuration of the base material 1402 may provide a benefit in that an additional insulating portion of air may be present between the base material 1402 and contact with a user of the insulating material 1400. Such an additional portion of air may provide additional heat-retention from the insulating material 1400.

Generally, it will be understood that the embodiments of FIGS. 13 and 14 may be views taken along a cross-section of a configuration of the insulating material such as that shown in FIG. 8 (with or without the heat-reflecting elements 804 as seen in FIGS. 13 and 14, respectively). Specifically, the embodiment of FIG. 13 may be considered to be a cross-sectional view taken along line B-B' of FIG. 8. The embodiment of FIG. 14 may be considered to be a cross-sectional view taken along line C-C' of FIG. 8.

Figure 15:
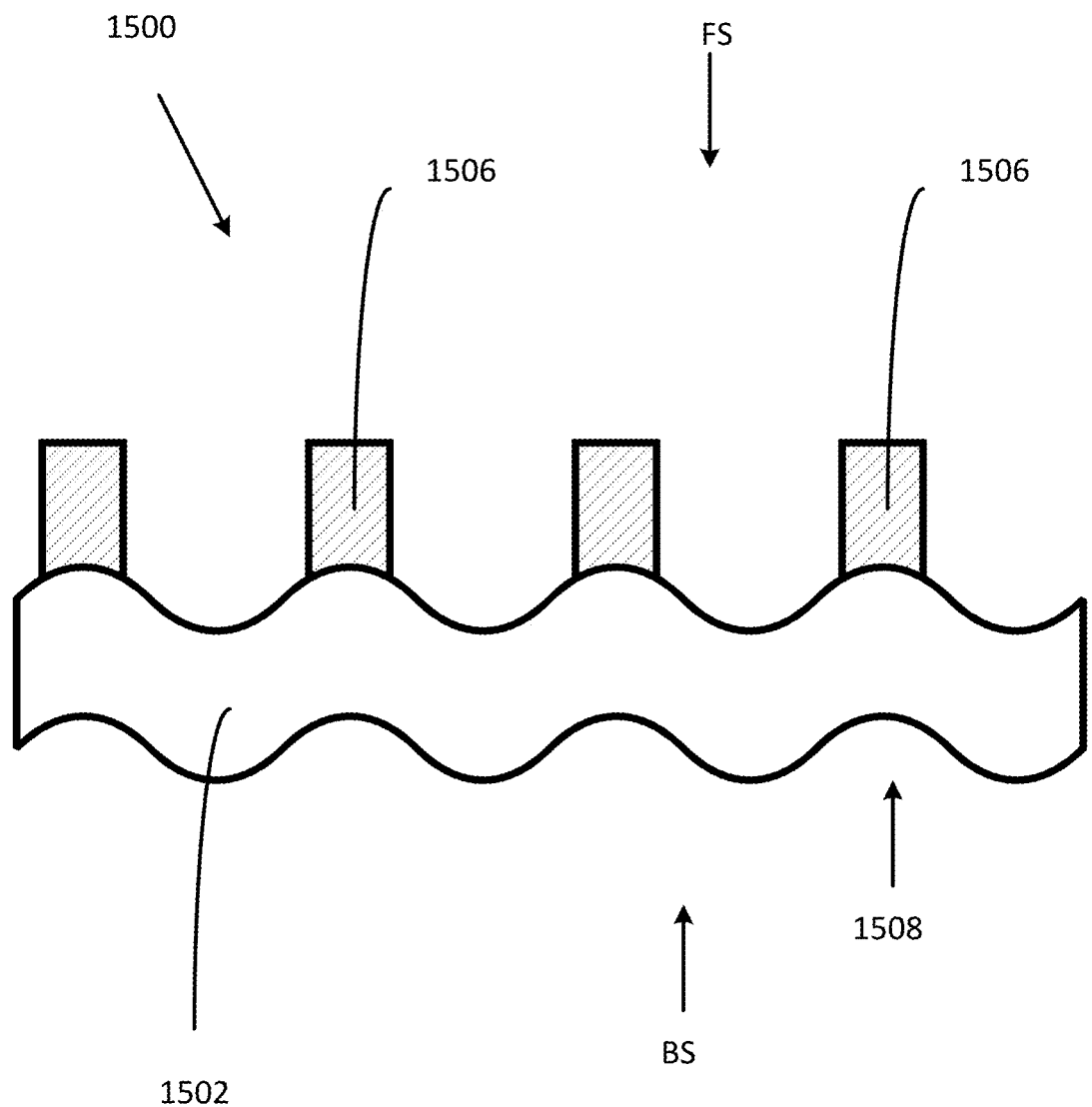
FIG. 15 illustrates an example side view of an alternative insulating material that includes a foam-based spacer material, in accordance with various embodiments.

FIG. 15 illustrates an example side view of an alternative insulating material 1500 that includes a foam-based spacer material 1506, in accordance with various embodiments. Specifically, the insulating material 1500 includes base material 1502 and foam-based spacer materials 1506, which may be respectively similar to base material 1102 and foam-based spacer materials 1106. Specifically, in this embodiment, the foam-based spacer materials 1506 may be discrete elements as shown, rather than a continuous element such as is depicted in FIGS. 13 and 14. Such discrete elements may correspond to the foam-based spacer materials depicted in FIGS. 10 and/or 11. In other embodiments, FIG. 15 may be considered to represent the embodiment of FIG. 8 (which may or may not include heat-reflecting elements 804) as viewed along a cross-sectional line A-A' of FIG. 8. In other words, the foam-based spacer materials 1506 may be the discrete foam-based spacer materials 806.

Additionally, similarly to FIG. 14, it will be noted that in this embodiment a heat-reflecting element may not be desirable, as the foam-based spacer materials 1506 and the rippled base material 1502 may provide a desirable amount of heat-retention without the need for such additional heat-reflecting elements.

As described above with respect to FIGS. 13 and 14, in some embodiments the foam-based spacer material may be deposited on the base material in some manner, and then it may contract during the curing process. Such contraction may cause the rippling of the base material. As may be seen in FIG. 15, the "peaks" of the ripple of the base material 1502 may be at the locations where the foam-based spacer material 1506 is present. Additionally, as a result of such rippling and "peaks," subsequent cavities 1508 may be introduced into the base material 1502.

Figure 16:
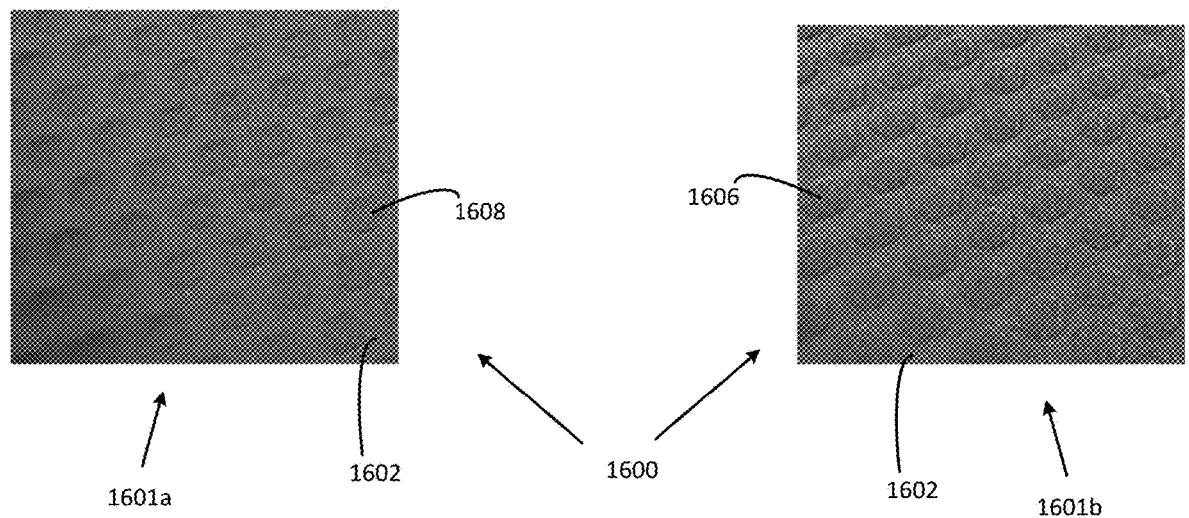
FIG. 16 illustrates example digital images of an insulating material that includes a foam-based spacer material, in accordance with various embodiments.

FIG. 16 illustrates example digital images 1601a and 1601b of an insulating material 1600 that includes a foam-based spacer material, in accordance with various embodiments. Specifically, the digital images 1601a and 1601b may be considered to be digital images of the simplified embodiment of FIG. 15 using the configuration of the foam-based spacer materials depicted in FIG. 11. FIG. 16 depicts an insulating material 1600 with a base material 1602 that includes cavities 1608 and foam-based spacer materials 1606, which may be respectively similar to base material 1502, cavities 1508, and foam-based spacer materials 1506. Image 1601a may be a perspective-view image taken from the backside (FS in FIG. 15) of the insulating material 1500. Similarly, image 1601b may be a perspective-view image taken from the frontside (BS in FIG. 15) of the insulating material 1500.

The "ripple" of the base material 1602 may be seen in FIG. 16. Specifically, the image 1601a depicts the various cavities 1608 that correspond to the locations of the foam-based spacer materials 1606, as described above with respect to FIG. 15.

It will be understood that the embodiments depicted and discussed herein with respect to, for example, FIGS. 8, 10, 11, 13, 14, and 15 are intended as example embodiments for the sake of discussion. Unless indicated otherwise, the various elements of those Figures are not drawn to scale, but rather certain features may be exaggerated for the purposes of discussion or visibility.

EXAMPLES

In various embodiments, the insulating materials described herein may have superior insulating characteristics as compared to other insulating materials, including materials that include heat-reflecting materials without VOF elements. As shown in Table 1 below, four different base materials were tested using standard hot plate testing. Samples of the four different base materials were tested in three different configurations: no heat reflecting or VOF elements ("Fabric"), heat-reflecting elements only ("Fabric+heat-reflecting element"), and with both heat-reflecting and VOF elements ("Fabric+heat-reflecting element+vertically oriented fiber"). Heat flux (W) and dry heat transfer rate (W/m²° C.) were measured, and an average insulation value (clo=0.155 K·m²·W.$^{-1}$) was calculated for each. As used herein, the term "heat" refers to thermal energy transported due to a temperature gradient (Jor Cal). As used herein, the term "heat rate" refers to thermal energy transported per unit time (J/s=W). As used herein, the term "heat flux" refers to heat rate per unit area. As used herein, the term "thermal transmittance" refers to heat flux per unit temperature gradient (W/m²·K). As used herein, the term "thermal resistance" refers to the reciprocal of thermal transmittance (m²·K/W) and clo, which is 0.155 m²·K/W, is a unit of measure for insulation value. The results of testing of specific examples of limited conduction heat reflective materials is shown below in Table 1.

TABLE 1

Thermal Resistance Data Measured Using Standard Hotplate Testing

| | Fabric | Fabric + heat-reflecting element | Fabric + heat-reflecting element + vertically oriented fiber |
|---|---|---|---|
| Base fabric 053165 | | | |
| Total thermal resistance, R$_{ct}$ (clo)[1] | 0.434 ± 0.003 | 0.403 ± 0.003 | 0.467 ± 0.003 |
| Thermal resistance of the fabric alone, R$_{cf}$ (clo) | 0.068 ± 0.004 | 0.048 ± 0.003 | 0.112 ± 0.009 |
| Base fabric 033770 | | | |
| Total thermal resistance R$_{ct}$ (clo)[1] | 0.478 ± 0.010 | 0.425 ± 0.015 | 0.484 ± 0.008 |
| Thermal resistance of the fabric alone, R$_{cf}$ (clo) | 0.123 ± 0.011 | 0.070 ± 0.015 | 0.129 ± 0.008 |
| Base fabric 031908 | | | |
| Total thermal resistance, R$_{ct}$ (clo)[1] | 0.387 ± 0.013 | 0.376 ± 0.007 | 0.455 ± 0.011 |
| Thermal resistance of the fabric alone, R$_{cf}$ (clo) | 0.032 ± 0.013 | 0.021 ± 0.007 | 0.100 ± 0.011 |
| Base fabric 060360 | | | |
| Total thermal resistance, R$_{ct}$ (clo)[2] | 0.560 ± 0.033 | 0.559 ± 0.007 | 0.668 ± 0.015 |
| Thermal resistance of the fabric alone, R$_{cf}$ (clo) | 0.047 | 0.046 | 0.155 |

[1]Bare plate thermal resistance, R$_{cbp}$ (clo) = 0.353 ± 0.002
[2]Bare plate thermal resistance, R$_{cbp}$ (clo) = 0.514 (no standard deviation provided)

Dry heat transport data were measured in general accordance with ASTM F1868, Part A—Thermal Resistance. Tests were conducted on 4 different base fabrics, the same fabrics with heat-reflecting elements, and the same materials with heat-reflecting elements plus vertically oriented fiber. The results are shown in Table 1 as the total thermal resistance, R$_{ct}$, and the thermal resistance of the fabric alone, R$_{cf}$. These values are given in clo units, and are also known as insulation values. In all cases, the insulation values are lower for the fabric+heat-reflecting element as compared to the same base fabric. When spacer elements (in this case, vertically oriented fiber elements) are added, however, the insulation values were greater than they are for the base fabric and for the fabric+heat-reflecting element by a substantial amount. Depending on the specific base material, insulation values of the disclosed insulating materials typically exhibit from 50% to 230% greater insulation values than the base materials from which they were constructed.

TABLE 2

Area-averaged Temperature from Heat Escape Maps

| Material | Average Backside Surface Temperature (° C.) | Temperature Difference from Base Material (° C.) |
|---|---|---|
| Fabric ("Base") | 33.4 | — |
| Fabric + vertically oriented fiber ("VOF only") | 32.5 | 0.9 |
| Fabric + heat-reflecting elements ("OHR only") | 32.3 | 1.1 |
| Fabric + heat-reflecting element + vertically oriented fiber ("OH3D") | 29.7 | 3.7 |

Figures 7A, 7B, 7C, 7D:
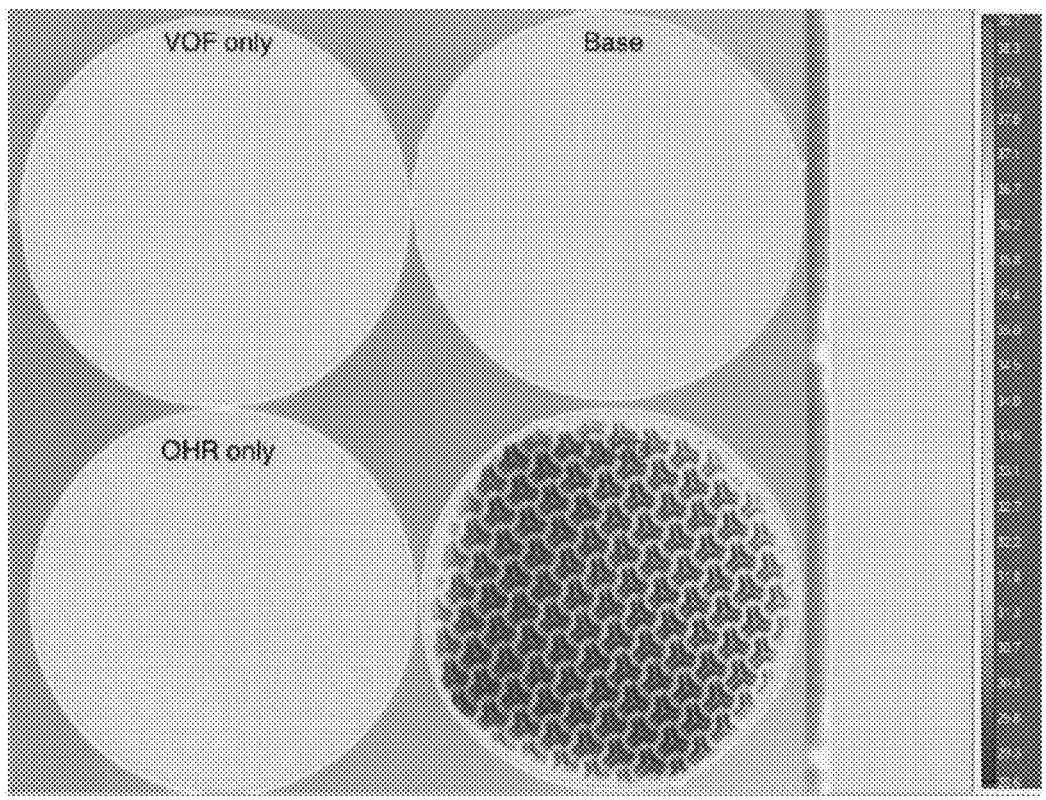
FIGS. 7A, 7B, 7C, and 7D are heat escape maps measured with an infrared (IR) thermal imaging camera, for base fabric with vertically oriented fiber (VOF) elements (FIG. 7A), base fabric alone (FIG. 7B), base fabric with heat-reflecting elements (FIG. 7C), and base fabric with heat-reflecting elements and VOF elements (FIG. 7D), in accordance with various embodiments.

FIGS. 7A, 7B, 7C, and 7B show heat escape maps measured with an IR thermal imaging camera, for base fabric with VOF elements (FIG. 7A), base fabric alone (FIG. 7B), base fabric with heat-reflecting elements (FIG. 7C), and base fabric with heat-reflecting elements and VOF elements (FIG. 7D), in accordance with various embodiments. The circular samples were placed face down on an insulated hot plate assembly set at approximately 37° C. The thermal images were taken of the backside of each of the fabric samples. Thus, for the fabric samples that contain VOF, heat-reflecting elements, or both, these features face toward the hot plate and therefore cannot affect the sample emissivity toward the infrared camera. As a result, the measured signal is an accurate measure of the temperature of the backside of each fabric, and representative of the amount of heat that escapes through the fabric.

Area-averaged temperatures from the heat escape maps of FIG. 7 are shown in Table 2. The highest average temperature, and the temperature closest to the temperature of the hot plate, is 33.4° C. for the base fabric. Thus, the most heat escapes through the base fabric, which is the least insulating of the four fabrics measured. The next highest average temperature is 32.5° C. for the base fabric+vertically oriented fiber ("VOF only"), followed by 32.3° C. for the base fabric+heat-reflecting elements ("OHR only"). The lowest average temperature is 29.7° C. for the base fabric+heat-reflecting elements+vertically oriented fiber ("OH3D"). Thus, the least amount of heat escapes through this fabric, which is the most insulating of the four fabrics measured.

Most significantly, the base fabric containing heat-reflecting elements+vertically oriented fiber is more insulating than the base fabric by a surprising and unexpected amount. By adding vertically oriented fiber to the base fabric, sufficient heat is trapped to lower the backside average temperature by 0.9° C. (see Table 2). By adding heat-reflecting elements to the base fabric, sufficient heat is trapped to lower the backside average temperature by 1.1° C. By adding both elements to the base fabric, one might expect the combined effect would lead to a lower temperature of around 2° C. (0.9° C.+1.1° C.), or even less since the elements overlap. However, the combined effect is nearly twice this amount. The combined effect of VOF and heat-reflecting elements traps enough heat to lower the backside average temperature by 3.7° C.

In another embodiment, foam pods (which may be similar to foam-based spacer materials such as those depicted at elements 1606 or 1106) were added to a base knit fabric (which may be similar to a base material such as base material 1602 or 1102), and the thermal resistance was measured for comparison against the same base fabric. As shown in Table 3, the effective thickness of a base knit fabric was increased from 0.68 mm to 0.84 mm, which is a 24% increase in thickness due to the presence of the foam pods and the "rippling" effect described above. However, surprisingly, the thermal resistance increased by greater than a factor of 2, or more than 100%. Fundamentally, it is expected that the insulation value of fabrics is linearly related to their thickness; thus, it is expected that increasing the insulation value by 100% would require a doubling of the thickness from 0.68 mm to 1.36 mm for this base fabric. By applying and curing foam pods to this fabric, the insulation value was doubled with only an increase in the effective thickness by 24%.

| Material | Thickness (mm) | Thermal resistance, $R_{cf}$ (clo) |
|---|---|---|
| Base knit fabric | 0.68 | 0.087 ± 0.010 |
| Base knit fabric + hexagonal foam pods | 0.84 | 0.178 ± 0.007 |

Figure 17:
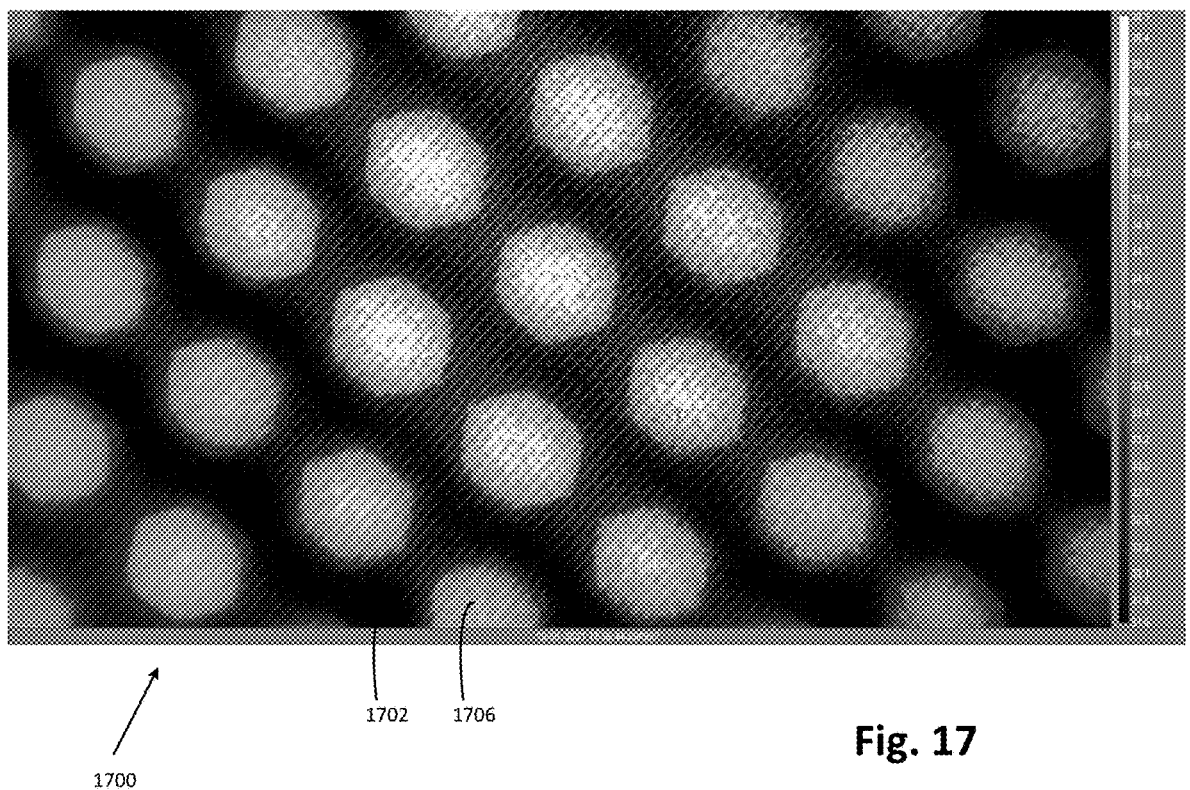
FIG. 17 depicts a thermal image of a fabric with a plurality of hexagonal foam-based spacer materials during a cooling cycle, in accordance with various embodiments.

Thermal imaging was conducted of the base fabric containing hexagonal foam pods. The material was placed on a hot plate at 35 degrees Celsius (° C.). During the cooling cycle, thermal images were collected as shown at 1700 in FIG. 17, showing the foam pods at a higher temperature than the fabric to which they are affixed. Specifically, FIG. 17 depicts a thermal image of a fabric (e.g., a base material 1702 such as base material 1602) with a plurality of hexagonal foam-based spacer materials 1706 (e.g., such as foam-based spacer materials 1606) during a cooling cycle after being heated on a hotplate to 35° C. The closed-cell nature of the foam pods renders them more insulative than an open-cell foam would be, and more insulative than the underlying base fabric, which is essentially an open-cell structure as well.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:
1. An insulating material comprising:
   a base material having a moisture vapor transfer rate (MVTR) of at least 2000 g/m$^2$/24 h (JIS 1099 A1);
   a plurality of heat-reflecting elements coupled to a first side of the base material, each heat-reflecting element having a heat-reflecting surface and being positioned to reflect heat towards a wearer of the insulating material; and a foam-based spacer material coupled to the first side of the base material, the foam-based spacer material defining an innermost surface of the insulating material and configured to face the wearer, wherein at least one of the plurality of heat-reflecting elements is at least partially between the foam-based spacer material and the base material.

2. The insulating material of claim 1, wherein the foam-based spacer material includes polyacrylate, polyurethane, or polyolefin.

3. The insulating material of claim 2, wherein the foam-based spacer material further includes a crosslinking agent.

4. The insulating material of claim 1, wherein the foam-based spacer material has a thickness between approximately 0.05 millimeters (mm) and approximately 0.15 mm.

5. The insulating material of claim 1, wherein the base material has a top surface and a bottom surface and a rippled profile present along both the top and bottom surfaces.

6. The insulating material of claim 5, wherein a peak of the rippled profile of the base material is adjacent to a portion of the base material that is coupled with the foam-based spacer material.

7. The insulating material of claim 1, wherein the foam-based spacer material has a line-shaped pattern, a cross-shaped pattern, a circle-shaped pattern, or a hexagonal-shaped pattern.

8. The insulating material of claim 1, wherein the foam-based spacer material is an array of discrete elements, wherein respective ones of the elements have a hexagonal pattern.

9. The insulating material of claim 1, wherein the insulating material is an element of an article of clothing.

10. The insulating material of claim 1, further comprising a series of cavities formed along the top and bottom surfaces of the base material resulting from the rippled profile.

11. The insulating material of claim 1, wherein the foam-based spacer material has a thickness of approximately 6 millimeters (mm).

12. An article of clothing comprising:
a base material having a moisture vapor transfer rate (MVTR) of at least 2000 g/m$^2$/24 h (JIS 1099 A1); and
a foam-based spacer material coupled to the first side of the base material, the foam-based spacer material defining an innermost surface of the article of clothing and configured to face a wearer of the article of clothing when the article of clothing is worn, wherein the foam-based spacer material is positioned between the base material and the wearer of the article of clothing when the article of clothing is worn;
a plurality of heat-reflecting elements, wherein at least one of the plurality of heat-reflecting elements is at least partially between the foam-based spacer material and the base material, wherein the foam-based spacer material is an array of discrete elements coupled with the base material and wherein the foam-based spacer material comprises a closed-cell foam to enhance heat-retention of the article of clothing.

13. The article of clothing of claim 12, wherein the foam-based spacer material includes polyacrylate, polyurethane, or polyolefin.

14. The article of clothing of claim 12, wherein the foam-based spacer material further includes a crosslinking agent.

15. The article of clothing of claim 12, wherein the foam-based spacer material has a thickness of approximately 0.1 millimeters (mm).

16. The article of clothing of claim 12, wherein the base material has a top surface and a bottom surface and a rippled profile present along both the top and bottom surfaces.

17. The article of clothing of claim 12, wherein a discrete element of the plurality of discrete elements has a line-shaped pattern, a cross-shaped pattern, a circle-shaped pattern, or a hexagonal-shaped pattern.

18. The article of clothing of claim 12, further comprising a series of cavities formed along the top and bottom surfaces of the base material resulting from the rippled profile.

19. The article of clothing of claim 12, wherein the foam-based spacer material has a thickness of approximately 6 millimeters (mm).

* * * * *